United States Patent [19]

Alix

[11] 4,371,192

[45] Feb. 1, 1983

[54] TENSION STOP FOR SAFETY BELT OF THE INERTIA REEL TYPE

[76] Inventor: Maurice A. J. Alix, Ecole Nationale des Métiers E.D.F., Gurcy-le-Chatel - Donnemarie-Dontilly, France, 77520

[21] Appl. No.: 223,012

[22] Filed: Jan. 6, 1981

[30] Foreign Application Priority Data

Jan. 11, 1980 [FR] France ................................ 80 00867

[51] Int. Cl.³ ............................................ B60R 21/10
[52] U.S. Cl. .................................... 280/801; 280/808; 24/171
[58] Field of Search ....................... 280/801, 808, 803; 24/171, 170, 168, 194

[56] References Cited

U.S. PATENT DOCUMENTS

| 115,654 | 6/1871 | Stephens | 24/171 |
|---|---|---|---|
| 422,741 | 3/1890 | Dearborn | 24/171 |
| 2,511,579 | 6/1950 | George | 24/171 |
| 3,494,571 | 2/1970 | Stoffel | 242/107.2 |

FOREIGN PATENT DOCUMENTS

| 2556497 | 6/1977 | Fed. Rep. of Germany . |
|---|---|---|
| 2635349 | 2/1978 | Fed. Rep. of Germany . |
| 2805588 | 8/1979 | Fed. Rep. of Germany . |
| 2340104 | 9/1977 | France . |
| 2381531 | 9/1978 | France . |
| 2427103 | 12/1979 | France . |
| 595228 | 2/1978 | Switzerland . |
| 1014353 | 12/1965 | United Kingdom . |
| 2005130 | 4/1979 | United Kingdom . |

Primary Examiner—Robert R. Song
Attorney, Agent, or Firm—DeLio and Libert

[57] ABSTRACT

The present invention relates to accessories for safety belts in the form of a tension stop which comprises a support piece defining a passage for a belt, as well as a blocking piece mobile with respect to the support piece and adapted to occupy two positions in which, respectively, it frees the passage or it projects locally therein to tighten the belt. The invention is applicable to safety belts for automobile vehicles.

6 Claims, 8 Drawing Figures

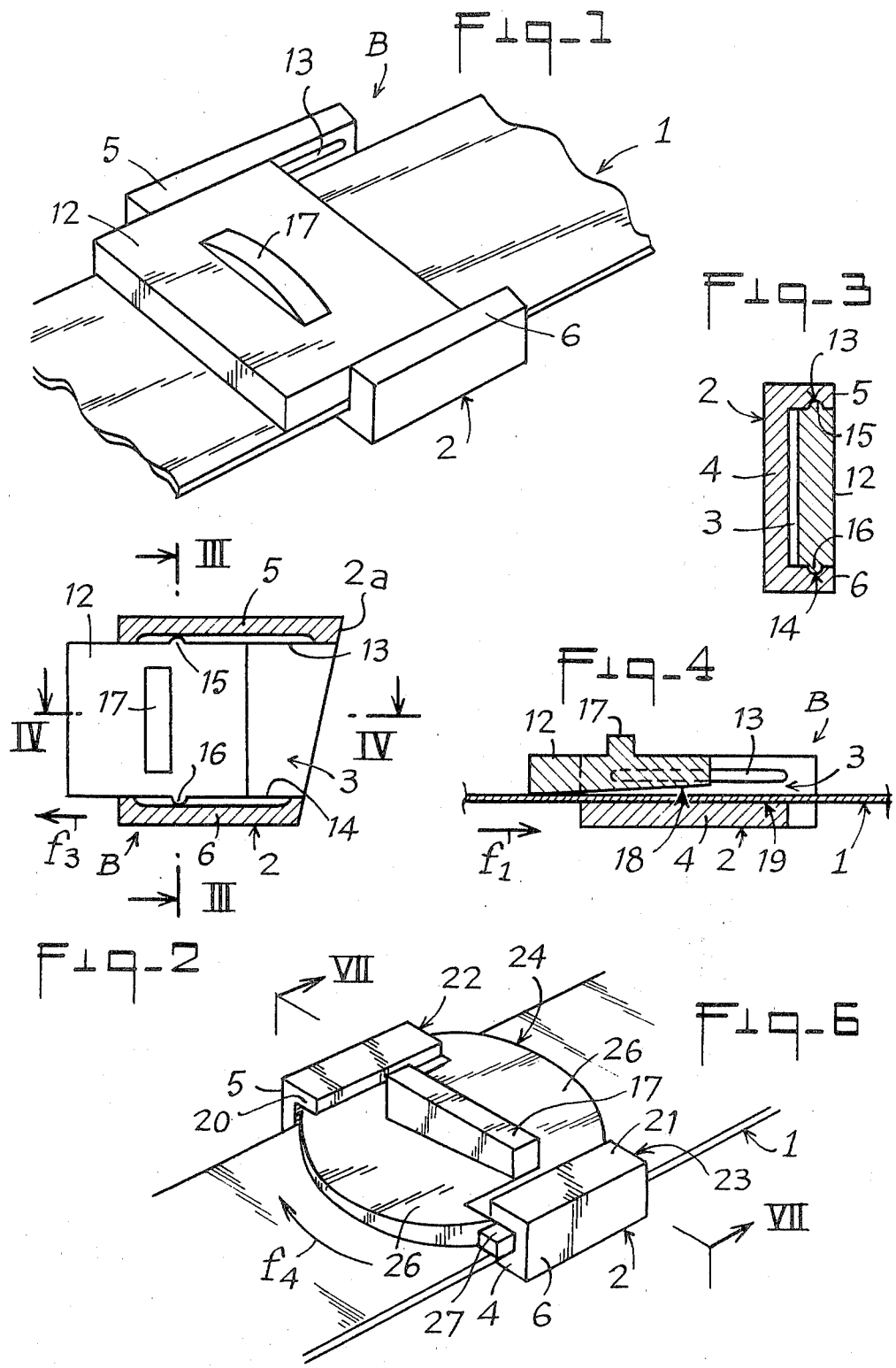

TENSION STOP FOR SAFETY BELT OF THE INERTIA REEL TYPE

The present invention relates to accessories for safety belts generally positioned in vehicles, and mainly automobile vehicles, and it relates more particularly to accessories for safety belts of the inertia reel type.

In this technical domain, it is known that, as a safety measure, it is frequent, if not compulsory, to furnish the interior of vehicles, such as automobiles, aircraft, etc... with safety belts of the inertia reel type. These safety belts, particularly in automobile vehicles, are of the so-called three point type, i.e. comprising a top anchoring or guide point generally designated $F_1$, a second, bottom, anchoring point, generally designated $F_2$, and a point of attachment designated $F_3$. The reel or retracting device may equally well be provided level with the top point $F_1$ or bottom point $F_2$.

Such an arrangement enables a safety belt of one length to be used, which forms, after attachment at point $F_3$, two straps passing in front of the body of the user occupying the seat thus equipped, forming a first, so-called sub-abdominal strap connecting point $F_2$ to point $F_3$, and a so-called thoracic strap connecting point $F_1$ to point $F_3$.

The safety belt of the above type is normally placed under constant tension by the reel or retractor, so as to apply the sub-abdominal and thoracic straps on the body of the user.

Such safety belts are generally satisfactory as they hold a user's body on the seat that he/she is occupying and efficiently oppose forward projection in case of shock in combination with an inertia blocking device.

However, it should be noted that such belts are not entirely satisfactory for certain users, being given that the action of the automatic reel or retractor maintains a constant tension on the thoracic strap between the point $F_1$ and point $F_3$ at least. The effect of such tension is that the thoracic strap is applied with minimum, but nonetheless constant pressure, on the chest of the user. Depending on the morphology or structure of the user, such a strain by pressure may become intolerable, to the point of causing the user to disconnect the safety belt deliberately to end such an intolerable constant pressure. It is obvious that, by doing this, the user eliminates all measure of safety normally offered by such a belt and therefore runs risks of corporal accident in case of shock.

In an attempt to solve this problem, a certain number of devices has been proposed. Mention should be made of clamps with articulated arms which are tightened to be immobilised on the belt. The clamp then represents a stop adapted to oppose the return action of the reel. Such devices are unsatisfactory for two reasons. The first is that, when it is open, the clamp is not retained on the belt. To avoid losing it, the user is therefore obliged to provide a place to keep it when it is not used. This is not propitious to rational use and most often obliges the user to search for and manipulate it prior to using it. The second is that it is generally not possible to adjust the clamping, with the result that the clamp may slip either as a result of wear or of a smaller thickness of the belt. Such a drawback is against effective use for the desired purpose.

Devices have also been proposed which employ a blocking member placed in a slot and formed by a manually manoeuvrable eccentric roller. Such devices do not have the first drawback mentioned above. However, it has proved that it is not practical to use them with one hand. In particular, it is sometimes, and even often difficult, if not impossible, to control a sufficient partial angular rotation of the eccentric roller to obtain a sufficient clamping of the belt to avoid any slip.

It is an object of the invention to remedy the above-mentioned drawbacks by proposing an accessory device which may be adapted on a safety belt, so as to eliminate the effect of constant strain or pressure applied on the user's chest by the thoracic strap, but without eliminating the advantages of safety inherent in the constitution of the belts of the above type.

To this end, the invention relates to a removable tension stop, whose position is adjustable, which may be adapted on the thoracic strap, so as to cooperate, by the effect of traction resulting from the action of the reel or retractor, with the guide slit close to anchoring point $F_1$ and which may be constituted by a simple ring or, on the contrary, by a window for passage provided in the side wall of the interior when the reel or retracting device is of the built-in or concealed type.

The device of the invention is designed so as to be practical, quick, reliable and efficient to handle when positioned or removed with one hand and possibly adjustable in position even during the course of driving.

Furthermore, the device of the invention is of particularly simple and robust design, so that it can be mass-produced and therefore marketed cheaply.

Another object of the invention resides in the fact that its design is chosen to avoid any risk of traumatism or voluntary or involuntary injury, whatever the position of the device on the safety belt.

In accordance with the invention, the tension stop for a safety belt of the inertia reel type is characterised in that it comprises:

a support piece which is in "U" form, comprising a base and two raised edges defining a passage with the base, said raised edges being provided with means for retaining a blocking piece and guiding said piece towards a position disengaged with respect to the passage or towards a position projecting inside said passage, a blocking piece constituted by a plate comprising:
means for cooperation with the retaining and guiding means.

a support, tightening and clamping face oriented in the direction of the base, an outer face provided with an actuating member.

The invention will be more readily understood on reading the following description with reference to the accompanying drawings, in which:

FIG. 1 is a perspective view illustrating an embodiment of the device according to the invention.

FIG. 2 is a plan view corresponding to FIG. 1.

FIGS. 3 and 4 are sections taken respectively along lines III—III and IV—IV of FIG. 2.

FIG. 6 is a perspective view illustrating another embodiment of the device.

Figure 5:
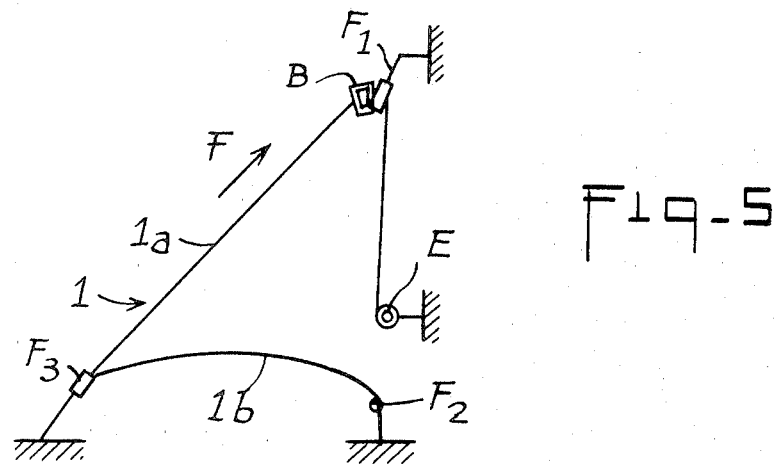
FIG. 5 is a diagram showing the adaptation of the stop on a safety belt.

According to the embodiment illustrated in FIG. 1, the tension stop B for safety belt of the inertia reel type, as partly shown and designated by reference 1, comprises a support piece 2 which defines a passage 3 for the belt 1. The support piece 2 is of "U" section, defined by a base 4 extended by two raised edges 5 and 6.

The support piece 2 is associated with a blocking piece 12 in the form of a slide block adapted to be slidably guided between the opposite faces of edges 5 and 6. FIGS. 2 and 4 show that the opposite faces of the edges 5 and 6 comprise grooves 13 and 14, with closed ends, adapted to receive complementary projections or protuberances 15 and 16 which are formed on the longitudinal sides of the slide block 12. The slide block is mounted in the passage 3 by elastic deformation to provoke passage of the projections 15 and 16 with respect to the closed ends and to ensure engagement of these projections in the grooves 13 and 14.

The slide block 12 comprises on its top face an actuating means 17 which may be made in recessed or projecting form. Opposite the actuating member 17, the slide block 12 comprises a face 18 which, with respect to the bottom 19 of the passage 3, inclines convergently in one of the directions of slide of the belt 1, in the direction of arrow $f_1$.

After the slide block 12 has been positioned in the support piece, as mentioned hereinabove, a displacement of the slide block in the direction of arrow $f_3$ causes the vertical displacement of the face 18 away from the bottom 19 of the passage 3 and, consequently, an increase in the section of passage thereof for the free slide of the belt 1. On the contrary, when the user moves the slide block 12 in the direction opposite that of arrow $f_3$, the face 18 progressively reduces the section of passage of the passage 3 and consequently clamps and tightens the belt 1 on which the stop B is thus immobilised.

FIG. 5 shows that the tension stop B is mounted on the thoracic strap 1a between the top anchoring or guide point $F_1$ and the anchoring point $F_3$ from which the belt forms a subabdominal strap 1b connecting said point $F_3$ to the second, bottom anchoring point $F_2$. According to this diagram, the belt 1 is mounted on a reel E which tends to maintain at least the thoracic strap 1a under a tension F which the tension stop aims at overcoming. To this end, the user exerts an action of traction on the thoracic strap 1a in the direction opposite arrow F, so as to release the tension of the thoracic strap, making it possible to adjust and immobilise the stop B on the thoracic strap near the top anchoring or guide point $F_1$. When the user releases his/her action on the thoracic strap 1a, the reel E acts again to apply the tension in the direction of arrow F, so that the tension stop is brought against the top anchoring or guide point $F_1$ on which it abuts by the constant action of the reel. This results in that the strap 1a is no longer subjected to the tension F, and consequently that the user is no longer under the constant pressure and strain normally applied on the chest, without any modification being made to the inertia blocking device (not shown) which immobilises the belt in case of shock.

As a general rule, the top anchoring or guide point $F_1$ is located in alignment with the back of the seat of a vehicle, so that the positioning of the belt is translated by an inflexion of the latter near the point $F_1$. So as to obtain a suitable abutment of the tension stop B on the point $F_1$, at least the support piece 2 is provided with an inclined transverse edge 2a with respect pect to the relative axis of displacement of the belt in the passage 3. This inclined edge 2a is provided so that, in position of use for a user driving a left-hand drive vehicle, the edge 5, directed towards the rear of the vehicle, is longer than the raised edge 6 oriented towards the front. In this way, the stop is supported over all the available transverse extent of the piece 2 and consequently maintains the optimal conditions of passage of the belt 1 at the anchoring or guide point $F_1$.

The device described hereinabove is preferably made of plastics material and may consequently be manufactured at low cost price, whilst giving the tension stop particularly good characteristics of strength and reliability.

It should be noted that the stop is designed so that there is no aggressive projecting piece and therefore no risk of untimely injury when such a stop is positioned on a safety belt.

Figure 7:
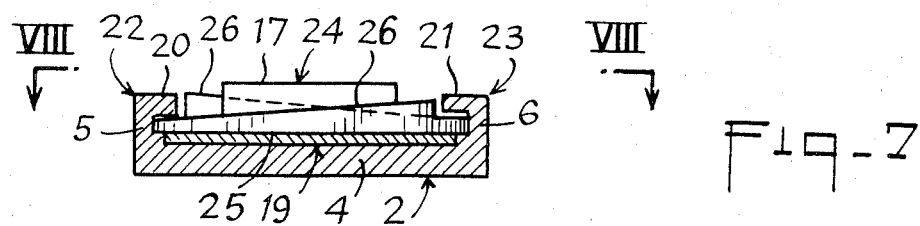
FIG. 7 is a section taken along line VII—VII of FIG. 6.
Figure 8:
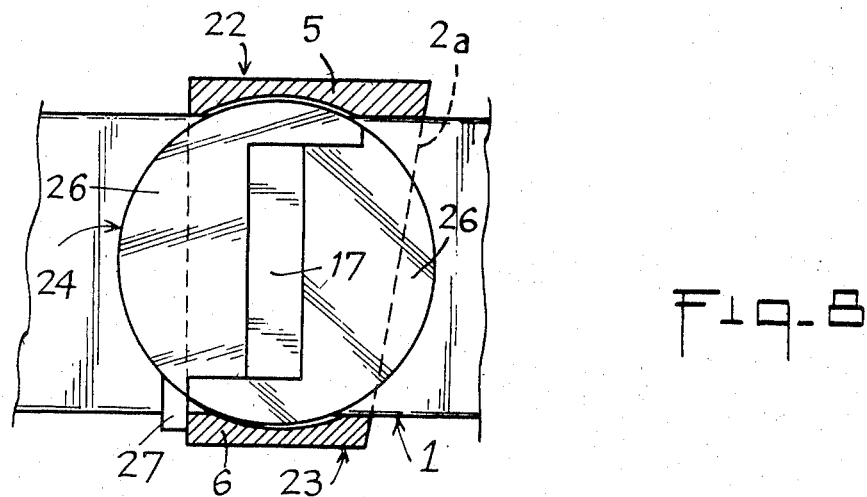
FIG. 8 is a plan view, partly in section, taken along line VIII—VIII of FIG. 7.

A variant embodiment of the tension stop is illustrated in FIGS. 6 to 8. In this variant, the support piece 2 comprises the raised edges 5 and 6 which, in time, are extended by flanges 20 and 21 extending parallel to the base 4 towards each other. The flanges 20 and 21 thus define guides 22 and 23 with which a circular plate 24 engaged and retained between the guides cooperates, so as to present a plane face 25 parallel to the base 19 of the passage 3. The top face of the plate 24 comprises, on either side of an actuating means 17, two inclined ramps 26 and 26 giving the plate 24 a thickness increasing progressively in the same angular direction.

In the position shown, the plate 24 gives a maximum height to the passage 3, resulting in a relative free slide with respect to the belt 1.

When the plate 24 is rotated in the direction of arrow $f_4$, the ramps 25 and 26 cooperate with the flanges 20 and 21 of the edges 5 and 6 and provoke the descending displacement of the plate on its axis of rotation with approach of the face 25 with respect to the bottom 19 of the passage 3. This results in a clamping and tightening of the belt 1 and immobilisation of the stop B thereon.

A stop 27 may advantageously be provided on the periphery of the plate 24, adapted to cooperate with at least one of the edges 5 or 6 to immobilise said plate in a maximum position of disengagement with respect to the section of passage of the passage 3.

As in the preceding example, the support piece 2 may advantageously comprise an inclined edge 2a. Similarly, it may be provided to give the bottom 19, as well as the face 25, a surface state introducing, at the moment of tightening, a coefficient of friction improving the immobilisation and relative blocking of the stop on the belt 1.

What is claimed is:

1. In a tension stop for safety belts of the inertia reel type, comprising, on the one hand, a support piece defining a passage for a belt and, on the other hand, a mobile blocking piece adapted to free the passage completely or to project herein to clamp and tighten the belt against the support piece, the support piece is in the form of a "U" comprising a base with two transverse edges and two raised edges defining the passage with the base, said raised edges being provied with means for retaining the blocking piece and guiding said piece towards a position disengaged with respect to the passage or towards a position projecting inside said passage, and wherein at least one transverse edge is inclined with respect to the axis of slide of the belt in the passage to provide support against the perimeter of a slit through which the safety belt passes, the blocking piece is constituted by a plate comprising:
- means for cooperation with the retaining and guiding means;
- an inner clamping face opposite and at a shallow angle to the inner face of the base of the support piece for tightening and clamping the belt between the inner face of the base and the clamping face; and
- an outer face provided with an actuating member.

2. The tension stop of claim 1, wherein the support piece defines a passage comprising, at least at base level, a surface state introducing a coefficient of friction with respect to the material constituting the belt.

3. The tension stop of claim 1, wherein the support piece cooperates with the blocking piece constituted by a slide block movably mounted in the direction of slide of the belt in the passage and comprising, opposite the inner face of the base of the support piece, a support face inclined convergently towards said face in one of the directions of slide.

4. The tension stop of claim 3, wherein the support piece defines in its parallel edges two grooves parallel to the direction of slide of the belt and cooperating with complementary projections made on the blocking piece.

5. A tension stop for safety belts of the inertia reel type, which comprises:
- a support pice in the form of a "U" comprising a base and two raised edges with inwardly turned flanges defining a passage for the belt; and
- a blocking piece constituted by a circular plate mounted in the support piece so as to rotate on its axis which is perpendicular to the bottom of the passage, said plate comprising, on its upper face, inclined ramps adapted to cooperate with the inwardly turned flanges on the edges of the support piece and provoking the displacement of said plate on its axis either to engage in or be disengaged from the passage, and having an actuating member on its upper face for rotating the blocking piece on its axis.

6. The tension stop of claim 5, wherein the support piece comprises at least one transverse edge which is inclined with respect to the axis of slide of the belt in the passage to provide support against the perimeter of a slit through which the safety belt passes.

* * * * *